G. ANGER.
TIRE.
APPLICATION FILED OCT. 28, 1912.

1,077,504.

Patented Nov. 4, 1913.

2 SHEETS—SHEET 1.

WITNESSES
Robert M. Sutphen
G. S. Weidman

INVENTOR
G. Anger
by Max A. Schmidt
Attorney

COLUMBIA PLANOGRAPH CO., WASHINGTON, D. C.

UNITED STATES PATENT OFFICE.

GOTTLIEB ANGER, OF McKEES ROCKS, PENNSYLVANIA, ASSIGNOR OF ONE-HALF TO THEODORE A. SPRAGUE, OF BELLEVUE, PENNSYLVANIA.

TIRE.

1,077,504.  Specification of Letters Patent.  Patented Nov. 4, 1913.

Application filed October 28, 1912. Serial No. 728,185.

*To all whom it may concern:*

Be it known that I, GOTTLIEB ANGER, a citizen of the United States, residing at McKees Rocks, in the county of Allegheny and State of Pennsylvania, have invented certain new and useful Improvements in Tires, of which the following is a specification.

This invention relates to that class of resilient or cushion tires in which the resilient or cushion element is a series of metallic springs which are interposed between a rigid inner rim and a yielding outer rim or tread which is composed of segments connected to each other by links.

It is the object of the invention to provide a simple and efficient tire of the kind stated, and also one which can be readily applied to any ordinary wheel rim without altering the same.

These objects are attained by a novel combination and arrangement of parts to be hereinafter described and claimed, reference being had to the accompanying drawings, in which—

Figure 1:
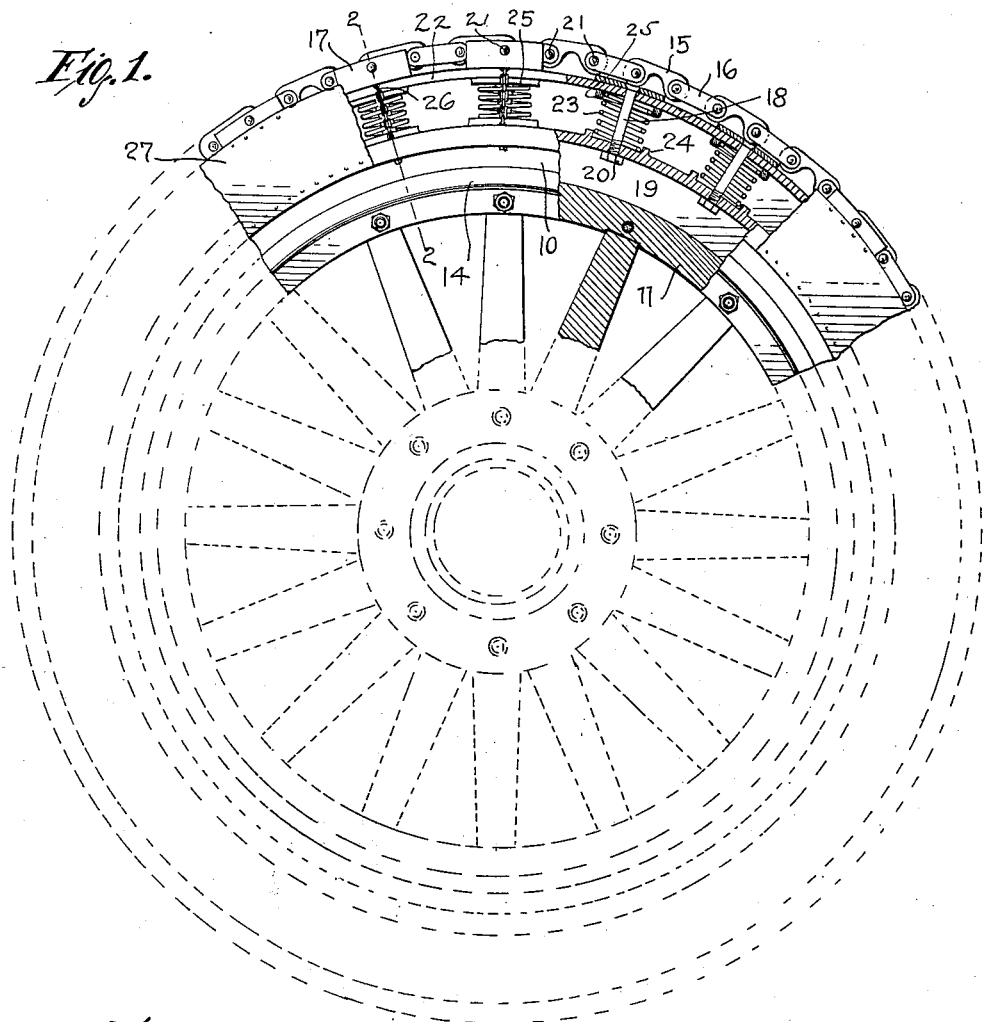
Figure 3:
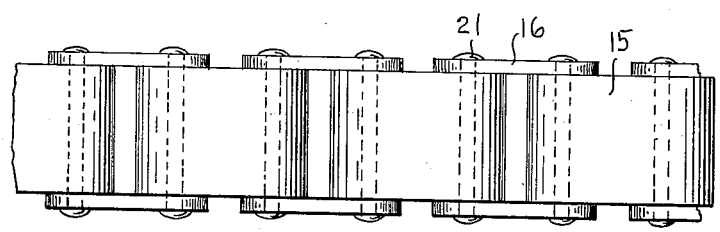
Figure 2:
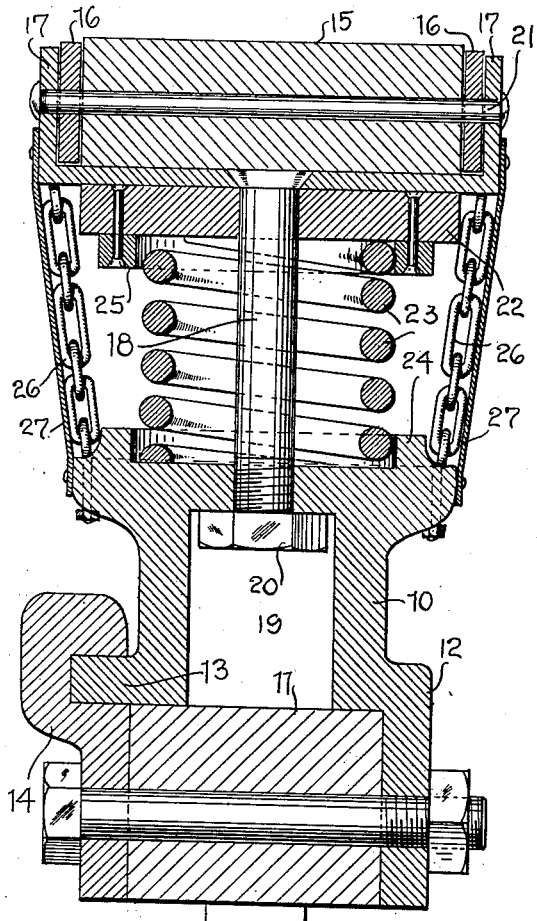

Figure 1 is an elevation of a wheel equipped with my improved tire, the parts being shown partly broken away and in section, Fig. 2 is a cross-section on the line 2—2 of Fig. 1. Fig. 3 is a plan view of a fragment of the tire tread.

In the drawings, 10 denotes the inner rigid rim of the tire, the same comprising a ring which is mounted on the rim 11 of an ordinary wheel so as to completely encircle the same. On one side of the ring is a continuous flange 12 which fits the corresponding side of the wheel rim and is bolted thereto. The other side of the ring has an outstanding base flange 13 onto which hooks a ring 14 which engages the corresponding side of the wheel rim and is bolted thereto. By means of the ring 14, and the flange 12, the ring 10 is securely fastened to the rim of the wheel. The fastening enables the tire to be easily and quickly applied or removed, and no alteration or modification in the structure of the rim or other parts of the wheel is necessary.

The tread of the tire is composed of an annular series of segments 15 which are spaced slightly endwise, and connected to each other on their sides by links 16. The segments and their connecting links seat in holders 17 extending in an annular series around the tire, and composed of channeled plates carried by stems 18 which are countersunk in the base portions of the holders, and pass loosely through apertures in the ring 10, said apertures opening into a channel 19 to accommodate nuts 20 screwed on the inner ends of the stems. In the side flanges of the holders, midway between the ends thereof, are alined perforations through which pass some of the pins 21 which connect the segments to the links 16, whereby the linked segments are prevented from "creeping" or rotating relative to the ring 10.

Between the holders 17 and the ring 10 is a rim 22 of leather or other suitable flexible material, and between this rim and the ring are located radially arranged coiled springs 23, which latter are coiled around the stems 18. The outer periphery of the ring 10 has seats 24 for the inner ends of the springs, and to the inner periphery of the rim 22 are secured seats 25 for the outer ends of the springs. The rim 22 has openings through which the stems 18 pass.

When the wheel is free from the ground, the tread extends concentrically with respect to the ring 10, but when the wheel is on the ground and loaded, the circular shape of the tread is distorted by the flattening out of the lower portion of the tread to a greater or less extent according to the load, this flattening out being resisted by the springs. The tire therefore has a deformable or yielding tread which is cushioned by the springs. Adjustment of the springs is readily made by the stems 18 and nuts 20.

The movement of the tread outward from the ring 10 is limited by short chains 26 connected at their ends to the sides of the ring 10 and the holders 17, respectively. In order to protect these chains, as well as the springs 23, from dust, mud, etc., the space between the ring 10 and the tread is closed up at the sides by a covering 27 of canvas or other suitable flexible material secured to the ring 10 and to the holders 17.

I claim:

1. A wheel tire comprising a rigid rim, a ring encircling the rim, said ring having a channel in its inner periphery and radial apertures opening from the channel through the outer periphery of the ring, means for securing the ring to the rim, a flexible rim encircling the ring in spaced relation, cushioning means between the ring and the flexible rim, an annular series of channeled plates mounted on the outside of the flexible rim and spaced apart endwise, a tread mounted in the channels of said plates, said tread being composed of segments which are spaced apart endwise, links connecting adjacent ends of said segments, certain of the connections between the links and the segments passing through the flanges of the channeled plates, and anchoring means for the tread passing through the flexible rim and the aforesaid radial apertures into the channel of the ring.

2. A wheel tire comprising a rigid rim, a ring encircling the rim, said ring having a channel in its inner periphery and radial apertures opening from the channel through the outer periphery of the ring, means for securing the ring to the rim, a flexible rim encircling the ring in spaced relation, cushioning means between the ring and the flexible rim, an annular series of channeled plates mounted on the outside of the flexible rim and spaced apart endwise, a tread mounted in the channels of said plates, said tread being composed of segments which are spaced apart endwise, links connecting adjacent ends of said segments, certain of the connections between the links and the segments passing through the flanges of the channeled plates, anchoring means for the tread passing through the flexible rim and the aforesaid radial apertures into the channel of the ring, and flexible connections between the ring and the channeled plates for limiting the outward movement of the latter.

In testimony whereof I affix my signature in presence of two witnesses.

GOTTLIEB ANGER.

Witnesses:
CHAS. F. ENGEL,
FRANK G. ENGEL.

---

Copies of this patent may be obtained for five cents each, by addressing the "Commissioner of Patents. Washington, D. C."